United States Patent
Gaur

(10) Patent No.: US 8,571,138 B2
(45) Date of Patent: *Oct. 29, 2013

(54) FAST GENERALIZED DECISION FEEDBACK EQUALIZER PRECODER IMPLEMENTATION FOR MULTI-USER MULTIPLE-INPUT MULTIPLE-OUTPUT WIRELESS TRANSMISSION SYSTEMS

(75) Inventor: Sudhanshu Gaur, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,415

(22) Filed: Apr. 16, 2012

(65) Prior Publication Data
US 2012/0201200 A1    Aug. 9, 2012

Related U.S. Application Data

(63) Continuation of application No. 12/401,711, filed on Mar. 11, 2009, now Pat. No. 8,175,189.

(51) Int. Cl.
*H04K 1/02*   (2006.01)
(52) U.S. Cl.
USPC ........... 375/296; 375/233; 375/260; 375/267; 455/114.2
(58) Field of Classification Search
USPC ........ 375/295, 296, 260, 267, 233; 455/114.2
See application file for complete search history.

(56) References Cited

U.S. PATENT DOCUMENTS

| | | | |
|---|---|---|---|
| 7,046,740 B2 | 5/2006 | Dowling | |
| 7,580,445 B2 * | 8/2009 | Wang et al. | 375/146 |
| 7,769,100 B2 * | 8/2010 | Cheong et al. | 375/285 |
| 7,813,420 B2 | 10/2010 | Cioffi et al. | |
| 8,175,189 B2 * | 5/2012 | Gaur | 375/296 |
| 2007/0014378 A1 | 1/2007 | Parhi et al. | |
| 2007/0253476 A1 | 11/2007 | Tirkkonen et al. | |
| 2008/0112504 A1 | 5/2008 | Jiang et al. | |
| 2008/0207238 A1 * | 8/2008 | Tosato | 455/507 |
| 2010/0310001 A1 * | 12/2010 | Yeh et al. | 375/267 |

FOREIGN PATENT DOCUMENTS

WO        20061021224 A1        3/2006

OTHER PUBLICATIONS

Chen, Chiang-Yu et al., "A Capacity-Approaching Algorithm for Resource Allocation in MIMO-OFDM Multiple-Access Channel", 2007.
Kusume, Katsutoshi et al., "Cholesky Factorization With Symmetric Permutation Applied to Detecting and Precoding Spatially Multiplexed Data Streams", 2007.

(Continued)

*Primary Examiner* — Sophia Vlahos
(74) *Attorney, Agent, or Firm* — Mattingly & Malur, PC

(57) ABSTRACT

A technique is used to realize a generalized decision feedback equalizer (GDFE) Precoder for multi-user multiple-input multiple-output (MU-MIMO) systems, which significantly reduces the computational cost while resulting in no capacity loss. The technique is suitable for improving the performance of various MU-MIMO wireless systems including future 4G cellular networks. In one embodiment, a method for configuring a GDFE precoder in a base station of a MU-MIMO wireless system having k user terminals, each user terminal having associated therewith a feedforward filter. The method comprises computing a filter matrix C using one of a plurality of alternative formulas of the invention; and, based on the computation of the filter matrix C, computing a transmit filter matrix B for a transmit filter used to process a symbol vector obtained after a decision feedback equalizing stage of the GDFE precoder, a feedforward filter matrix F, and an interference pre-cancellation matrix G.

19 Claims, 4 Drawing Sheets

(56) References Cited

OTHER PUBLICATIONS

Haustein, Thomas et al., "Real-Time Signal Processing for Multiantenna Systems: Algorithms, Optimization, and Implementation on an Experimental Test-Bed", 2006.

Ginis, George et al., "Vectored Transmission for Digital Subscriber Line Systems", 2006.

Spencer et al. "Zero-Forcing Methods for Downlink Spatial Multiplexing in Multiuser MIMO Channels", IEEE Transactions on Signal Processing, vol. 52, No. 2, pp. 461-471, Feb. 2004.

Windpassinger et al., "Precoding in Multi-Antenna and Multi-User Communications", IEEE Transactions on Wireless Communications, pp. 1305-1316, Jul. 2006.

Yu, "Capacity and Coding for Multi-Antenna Broadcast Channels", PhD Dissertation, Stanford University, Electrical Engineering Department, Feb. 20, 2002.

Yu et al., "Sum Capacity of Gaussian Vector Broadcast Channels", IEEE Transactions on Information Theory, vol. 50, No. 9, pp. 1875-1892, Sep. 2004.

Shao et al., "Precoder Design for MIMO Broadcast Channels", IEEE International Conference on Communications, vol. 2, pp. 788-794, May 2005.

Jindal et al. "Sum Power Iterative Water-Filling for Multi-Antenna Gaussian Broadcast Channels", IEEE Transactions on Information Theory, vol. 51, No. 4, pp. 1570-1580, Apr. 2005.

Yu, "The Structure of Least-Favorable Noise in Gaussian Vector Broadcast Channels", DIMACS Series in Discrete Mathematics and Theoretical Computer Science, May 2004.

\* cited by examiner

FAST GENERALIZED DECISION FEEDBACK EQUALIZER PRECODER IMPLEMENTATION FOR MULTI-USER MULTIPLE-INPUT MULTIPLE-OUTPUT WIRELESS TRANSMISSION SYSTEMS

This application is a continuation of U.S. patent application Ser. No. 12/401,711, filed Mar. 11, 2009, now allowed the content of which is hereby incorporated by reference into this application.

FIELD OF THE INVENTION

The present invention relates to multiple-input multiple-output (MIMO) communications systems. More specifically, the present invention relates to precoder configuration in MIMO systems. This

BACKGROUND OF THE INVENTION

It is well known that a Generalized Decision Feedback Equalizer (GDFE) based precoder provides the optimal capacity solution for Multi-user Multiple-Input Multiple-Output (MU-MIMO) wireless systems. However, the computational cost of determining various filters associated with the GDFE Precoder is often prohibitive and is not suitable for many practical systems.

There are several known Precoding techniques which can enable a Base Station (BS) equipped with multiple antennas to send simultaneous data streams to multiple user terminals (UTs) in order to optimize system capacity. In general, Precoding for a MU-MIMO system aims to optimize a certain criterion such as system capacity or bit error rate. Selected references are noted below, together with a description of relevant aspects of the techniques proposed therein.

Q. H Spencer, A. L. Swindlehurst, and M. Haardt, "Zero-forcing methods for downlink spatial multiplexing in multi-user MIMO channels", IEEE Transactions on Signal Processing, pp. 461-471, February 2004 [1] describes a linear precoding technique, known as Block Diagonalization (BD), which separates out the data streams to different UTs by ensuring that interference spans the Null Space of the victim UT's channel. The BD technique diagonalizes the effective channel matrix so as to create multiple isolated MIMO sub-channels between the BS and the UTs. Although this scheme is simple to implement, it limits system capacity somewhat.

C. Windpassinger, R. F. H Fischer, T. Vencel, and J. B Huber, "Precoding in multi-antenna and multi-user communications", IEEE Transactions on Wireless Communications, pp. 1305-1316, July 2004 [2] describes a non-linear precoding scheme known as Tomlinson-Harashima Precoding (THP). This scheme relies on successive interference pre-cancellation at the BS. A modulo operation is used to ensure that transmit power is not exceeded. Different from BD, THP triangularizes the effective channel matrix and provides somewhat higher system capacity when compared to BD.

In W. Yu, "Competition and Cooperation in Multi-User Communication Environments", PhD Dissertation, Stanford University, February 2002 [3] and W. Yu and J. Cioffi, "Sum capacity of Gaussian vector broadcast channels", IEEE Transactions on Information Theory, pp. 1875-1892, September 2004 [4], Wei Yu introduced the GDFE Precoder and showed that it achieves a high degree of system capacity. The basic components of this scheme are illustrated in FIG. 1. The GDFE Precoder includes an interference pre-cancellation block 101. Similar to the THP precoding scheme discussed in reference [2] above, the interference pre-cancellation helps to ensure that the symbol vector encoded at the $k^{th}$ step will suffer from the interference from (k-1) symbol vectors only. Information symbols u are processed by the interference pre-cancellation block 101 to produce filtered vector symbols x.

The filtered vector symbols x are then passed through a transmit filter 103 denoted by matrix B to produce transmitted signals y. In reference [3] and [4], a technique based on the covariance matrix ($S_{zz}$) corresponding to "Least Favorable Noise" is proposed to compute the GDFE Precoder components. Although, this technique achieves a high degree of system capacity, the computational cost of determining the GDFE Precoder components is effectively prohibitive for a real-time implementation required by most practical systems.

X. Shao, J. Yuan and P. Rapajic, "Precoder design for MIMO broadcast channels", IEEE International Conference on Communications (ICC), pp. 788-794, May 2005 [5] proposes a different precoding technique which achieves a capacity close to the theoretical maximum system capacity. The proposed method is computationally less complex compared to the GDFE Precoder technique. However, the proposed method allocates equal power to all data streams, which may not be an effective technique for practical systems using a finite number of quantized bit-rates. Also, the proposed technique is limited to invertible channel matrices, which may not always be the case.

N. Jindal, W. Rhee, S. Vishwanath, S. A. Jafar, and A. Goldsmith, "Sum Power Iterative Water-filling for Multi-Antenna Gaussian Broadcast Channels", IEEE Transactions on Information Theory, pp. 1570-1580, April 2005 [6] derives a very useful result referred to as the MAC/BC (multiple access channel/broadcast channel) duality.; and Wei Yu, DIMACS Series in Discrete Mathematics and Theoretical Computer Science, Vol. 66, "Advances in Network Information Theory," pp. 159-147 [7] develops the concept of least favorable noise.

SUMMARY OF THE INVENTION

A technique is used to realize a GDFE Precoder for multi-user (MU) MIMO systems, which significantly reduces the computational cost while resulting in no capacity loss. The technique is suitable for improving the performance of various MU-MIMO wireless systems including presently planned future "4G" cellular networks.

The described implementation of a GDFE Precoder relaxes the requirement for knowledge of the covariance matrix ($S_{zz}$) corresponding to "Least Favorable Noise." This is the key component in conventional design of a GDFE Precoder and requires extensive computational cost. It also provides a uniform framework for realizing a GDFE Precoder. Unlike conventional GDFE Precoder design, the proposed method does not require channel reduction when the Input Covariance Matrix ($S_{xx}$) for downlink channel is rank deficient.

The described implementation of a GDFE Precoder achieves significant improvement in computational cost over conventional GDFE Precoders.

An aspect of the present invention is directed to a method for configuring a generalized decision feedback equalizer (GDFE) based precoder in a base station of a multi-user multiple-input multiple-output (MU-MIMO) wireless system having k user terminals (UTs), each user terminal (UT) having associated therewith a feedforward filter. The method comprises computing a filter matrix C using one of a plurality of alternative formulas of the invention as described below; and, based on the computation of the filter matrix C, computing a transmit filter matrix B for a transmit filter used to process a symbol vector obtained after a decision feedback equalizing stage of the GDFE precoder, computing the feedforward filter matrix F, and computing the interference pre-cancellation matrix G.

Another aspect of the invention is directed to a GDFE based precoder in a base station of a MU-MIMO wireless system having k user terminals, each user terminal having associated therewith a feedforward filter. The GDFE precoder comprises a feedforward path; a feedback path; and an interference pre-cancellation block denoted by I–G disposed in the feedback path, I being an identity matrix, G being an interference pre-cancellation matrix. A feedforward filter matrix F is related to the interference pre-cancellation matrix by a novel expression as described below.

Yet another aspect of the invention is directed to a GDFE based precoder in a base station of a MU-MIMO wireless system having k user terminals, each user terminal having associated therewith a feedforward filter. The GDFE precoder comprises a feedforward path; a feedback path; and an interference pre-cancellation block denoted by I–G disposed in the feedback path, I being an identity matrix, G being an interference pre-cancellation matrix. The interference pre-cancellation matrix G in the interference pre-cancellation block is determined by computing a filter matrix C using one of a plurality of alternative formulas of the invention as described below; and, based on the computation of the filter matrix C, computing a transmit filter matrix B for a transmit filter used to process a symbol vector obtained after a decision feedback equalizing stage of the GDFE precoder, computing the feedforward filter matrix F, and computing the interference pre-cancellation matrix G.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
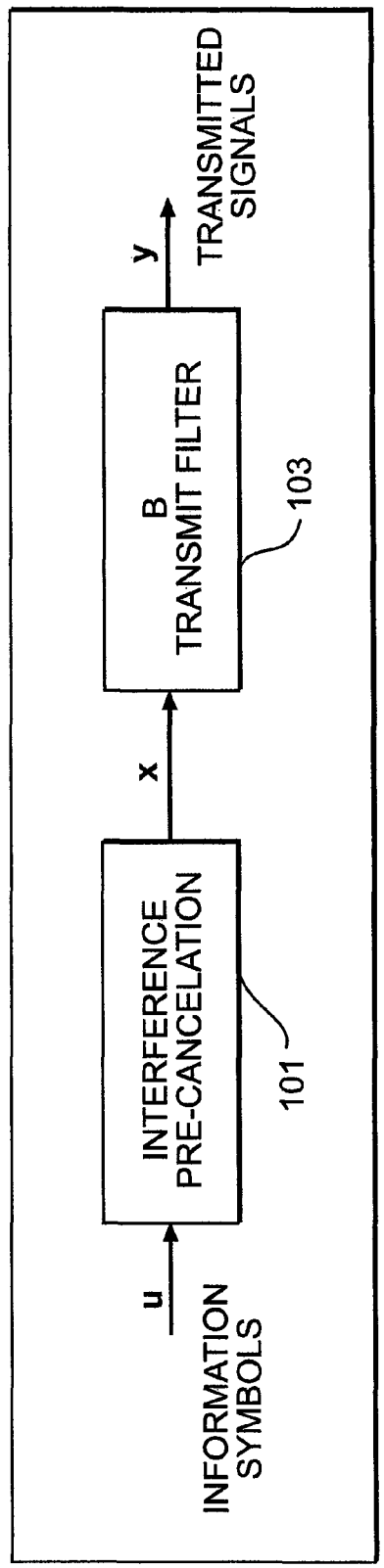
FIG. 1 is a block diagram of a known GDFE Precoder.

In the following, the system model and relevant prior art are first described in sub-section A, followed in sub-section B by a description of implementations of a GDFE Precoder.

Those of ordinary skill in the art will realize that the following detailed description of the present invention is illustrative only and is not intended to be in any way limiting. Other embodiments of the present invention will readily suggest themselves to such skilled persons having the benefit of this disclosure. It will be apparent to one skilled in the art that these specific details may not be required to practice to present invention. In other instances, well-known circuits and devices are shown in block diagram form to avoid obscuring the present invention. In the following description of the embodiments, substantially the same parts are denoted by the same reference numerals.

First, the system model and notations used thereafter are set forth. Let the base station (BS) have N antennas and let there be K user terminals (UTs) with $L_k$ antennas each. The sum of antennas at UTs is denoted as $L=\Sigma_{k=1}^{K} L_k$. Let $H_k$ denote the channel gain matrix of dimensions $\{L_k \times N\}$ between the BS and the $k^{th}$ UT. The combined channel gain matrix between the BS and the K UTs is of dimension $\{L \times N\}$ and is given by $H=[H_1^T \ H_2^T \ \ldots \ H_K^T]^T$, where the superscript $^T$ denotes the matrix transpose.

Let $u_k$ denote the input symbol vector destined for the $k^{th}$ UT, so that the stacked input vector can be represented as $u=[u_1^T u_2^T \ldots u_K^T]^T$. The length of u is assumed not to exceed the number of antennas at the BS. Also, assume the additional constraint that $S_{uu}=E[uu^H]=I$, where E[.] indicates the time average of its argument, the superscript H denotes the conjugate transpose and I denotes the identity matrix.

A.1 Definitions

Figure 2:
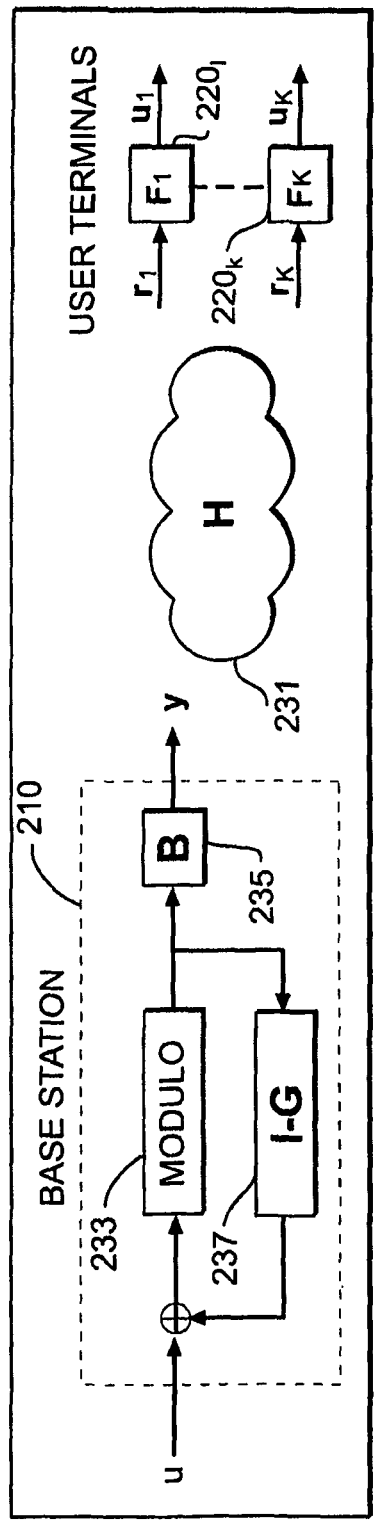
FIG. 2 is a block of a communications system using GDFE Precoding.

Referring to FIG. 2, a functional block diagram is shown of a MU-MIMO system having a base station 210 and user terminals $220_1$-$220_k$. Each user terminal has associated therewith a feedforward filter $F_1$-$F_k$. Communications occur through a channel 231 represented by a channel matrix H. The base station includes a GDFE Precoder including a feedforward path and a feedback path. In the feedforward path, a modulo unit 233 produces a stream of filtered vector symbols X, which are filtered by a transmit filter 235 to produce a transmitted signal stream y. In the feedback path, the symbols X are fed back through an interference pre-cancellation block 237, represented by an interference pre-cancellation matrix G subtracted from the identity matrix I. A stream of user symbols u has subtracted therefrom an output signal of the interference pre-cancellation block 237, with the result being applied to the modulo unit 233.

Other aspects/parameters related to this system model are described below:

1) Interference Pre-Cancellation Matrix (G): This matrix is used at the transmitter at Interference Pre-cancellation Stage of the GDFE Precoder as shown in FIG. 2. The main purpose of this matrix is to process input symbol vector u for interference pre-cancellation purposes. Its structure is that of an Upper Right Triangular matrix with block diagonal sub-matrices being identity matrices each of size $a_k$.

2) Input Covariance Matrix for Downlink Channel ($S_{xx}$): It is defined as $S_{xx}=E[xx^H]$ and satisfies the transmit power constraint, i.e., $trace(S_{xx}) \leq P_t$, where $P_t$ denotes the total available transmit power and trace(.) indicates the sum of diagonal elements of the matrix argument. The input covariance matrix for the downlink channel represents dependencies of symbols transmitted from different ones of said N transmit antennas; a sum of diagonal matrix elements represents an intended total transmit power from the N transmit antennas. In the following text, $S_{xx}$ will be represented using its Eigen Value Decomposition (EVD) as:

$$S_{xx}=V\Sigma V^H \quad (1)$$

where V is a unitary matrix and $\Sigma$ is a diagonal matrix with non-negative entries.

3) Transmit Filter (B): This matrix is used to process the symbol vector x obtained after the DFE stage of GDFE Precoder as shown in FIG. 2. It is denoted by the following equation:

$$B=V\Sigma^{1/2}M \quad (2)$$

where M is a unitary matrix and the matrices $\{V, \Sigma\}$ are same as defined in (1).

4) Least Favorable Noise Covariance Matrix ($S_{zz}$): This may be regarded as the noise covariance matrix that results in the minimum system capacity when full coordination among all UTs is assumed. This is a positive definite Hermitian Matrix whose block diagonal sub-matrices are identity matrices of size $a_k$. This is defined in a similar fashion to that shown in Eq. (67) of reference [4].

5) Input Covariance Matrix for Equivalent Uplink Channel (D): It is defined similar to the Equation (3.6) of reference [7] as the correlation among the symbols of the input vector for the equivalent Uplink/Medium Access Channel (MAC) with channel matrix $H^H$. The structure of matrix D is that of a block diagonal matrix and satisfies the transmit power constraint, i.e., trace(D)≤$P_t$, where $P_t$ denotes the total available transmit power. Each block diagonal sub-matrix of D represents the input covariance matrix for a particular UT in the Uplink channel. A capacity optimal D can be computed using the methodology presented in reference [6].

A.2 Transmitter Processing

As shown in FIG. 2, the GDFE Precoder includes an interference pre-cancellation block denoted by I–G, where G has the structure of a Block Upper Right Triangular matrix. Similar to the THP precoding scheme of reference [2], the triangular structure of the feedback matrix G helps to ensure that the symbol vector encoded at the $k^{th}$ step will suffer from the interference from (k-1) symbol vectors only. The $x_k^{th}$ sub-vector of $x=[x_1^T x_2^T \ldots x_K^T]^T$ is generated using the following relationship:

$$x_k = \left(u_k - \sum_{m=k+1}^{K} G_{km}x_m\right) + \alpha_k \quad (3)$$

where $G_{km}$ denotes the sub-matrix of G required to pre-cancel interference due to the vector symbol $x_m$ from $x_k$. These sub-vectors are generated in the reverse order, with $x_K$ being the first generated vector and $x_1$ being the last one. An example of the structure of the matrix G for a 3 UT scenario is shown below $$G = \begin{bmatrix} I & G_{12} & G_{13} \\ 0 & I & G_{23} \\ 0 & 0 & I \end{bmatrix} \quad (4)$$

In this particular example, $x_3$ is generated first, followed by $x_2$ from which interference due to $x_3$ is pre-subtracted using the sub-matrix $G_{23}$. Lastly, $x_1$ is generated after pre-subtraction of interference due to $x_2$ and $x_3$. Also, each complex element of vector $\alpha_k$ in (3) is chosen from the following set:

$$A = \{2\sqrt{S}(p_I + jp_Q) | p_I, p_Q \in \{\pm 1, \pm 3, \ldots, \pm(\sqrt{S}-1)\}\} \quad (5)$$

where S is the constellation size.

The elements of $\alpha_k$ are chosen such that the elements of the resulting vector $x_k$ are bounded by the square region of width $2\sqrt{S}$. This mechanism, while allowing for interference pre-cancellation, also limits the total transmit power.

The vector x is then passed through a transmit filter B to yield a vector y given by the following relationship:

$$y = Bx \quad (6)$$

The vector y is transmitted by mapping its element to the respective antenna elements of the Base Station.

A.3 Receiver Processing

Let the feedforward filter employed by $k^{th}$ UT be denoted by $F_k$, which is a matrix of dimension $\{a_k \times L_k\}$ where $a_k$ denotes the length of vector $u_k$. Now, the received baseband vector corresponding to the $k^{th}$ UT is given by $$r_k = F_k HBx + F_k n_k \quad (7)$$

where x is the symbol vector derived from input symbol vector u after an interference pre-cancellation step as shown in FIG. 2. The filter B indicates the transmit filter, and noise at $k^{th}$ UT is denoted by $n_k$. The stacked received basedband vector corresponding to all K UTs can be represented as $$r = FHBx + Fn \quad (8)$$

where, $F = \text{diag}(F_1, F_2, \ldots F_K)$ is a block diagonal matrix representing the feedforward filter and n represents stacked noise vector.

In the following, different methods are presented to compute matrices B, G and F as defined earlier. One method assumes the knowledge of $S_{zz}$ whereas other methods provide ways to compute GDFE matrices without any knowledge of $S_{zz}$.

B. Computation of GDFE Precoder Matrices

Unlike prior methods, in the present method the feedforward filter, F, is expressed as:

$$F = GM^H(HV\Sigma^{1/2})^H[HS_{xx}H^H + S_{zz}]^{-1} \quad (9)$$

where the "Least Favorable Noise," $S_{zz}$, may be regarded as the noise covariance matrix that results in the minimum system capacity when there is full coordination among all UTs. $S_{zz}$ may be computed using the technique described in reference [4]. The matrices $\{V, \Sigma\}$ are same as defined in (1).

The input covariance matrix $S_{xx}$ for the downlink channel may be computed by first computing the input covariance matrix D for the equivalent Uplink/Medium Access Channel (MAC) with channel gain matrix $H^H$. The capacity achieved by the proposed GDFE method is the same as the capacity achieved by the choice of D for the equivalent Uplink channel. A capacity optimal D can be computed using the methodology presented in reference [6]. The input covariance matrix $S_{xx}$ for the downlink channel can then be computed using the following equation given in reference [7]:

$$S_{xx} = \frac{I - [H^H D H + I]^{-1}}{\lambda} \quad (10)$$

where for a given total transmit power $P_t$, the scalar variable $\lambda$ can be computed as:

$$\lambda = \text{trace}(I - [H^H D H + I]^{-1})/P_t \quad (11)$$

Figure 4:
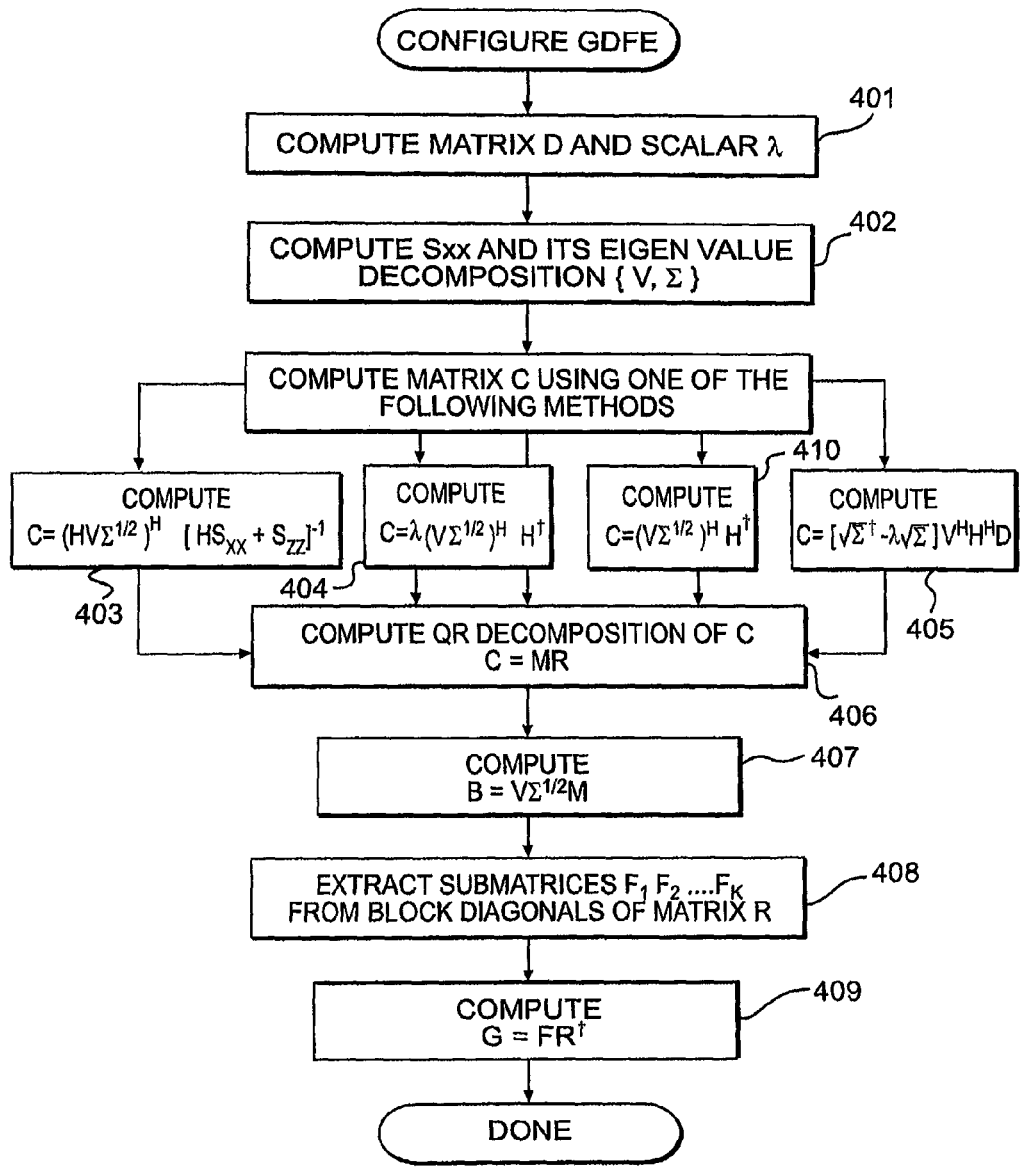
FIG. 4 is a flowchart of configuring a GDFE Precoder.

Next, referring to FIG. 4, a filter matrix C is defined as:

$$C = (HV\Sigma^{1/2})^H[HS_{xx}H^H + S_{zz}]^{-1} \quad (12)$$

(step 403 in FIG. 4). Now, the feedforward filter F can be represented as $$F = GM^H C \quad (13)$$

It can be noted that F is Block Diagonal and G is Block Upper Right Triangular with Identity matrices forming its diagonal block. Given that M is unitary matrix; pre-multiplication of $M^H$ with C must result in a Block Upper Right Triangular matrix R. Hence, M can be obtained using the QR decomposition (QRD) of C as $$C = MR \quad (14)$$

(step 406). It must be noted that the QRD is performed in such a way that all non-zero columns of C which span the same vector space contribute to only one column vector in matrix M. Computation of matrices B, G and F is then performed as follows:

$$\text{Compute } B = V\Sigma^{1/2} M \text{ (step 407)} \quad (15)$$

$$\text{Set } F = \text{BlockDiagonal}(R) \text{ (step 408)} \quad (16)$$

Figure 3:
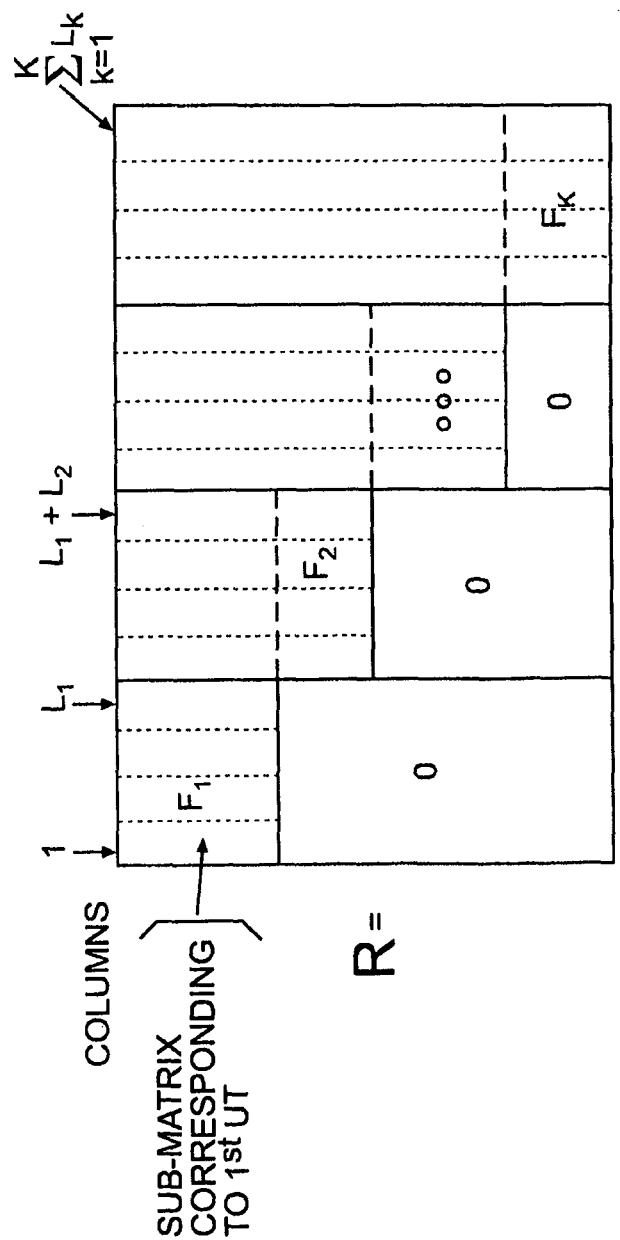
FIG. 3 is a block diagram of configuring feedforward filter of GDFE Precoder.

The BlockDiagonal(.) function extracts submatrices $F_1, F_2, \ldots, F_K$ of size $\{a_k \times L_k\}$ from the block diagonals of the matrix R as illustrated in FIG. 3. The number of symbols, $a_k$, allotted to the $k^{th}$ UT equals the rank of $F_k$.

$$\text{Compute } G = FR^\dagger \text{ (step 409)} \quad (17)$$

where the superscript † denotes the Moore-Penrose Generalized Inverse.

B.1 Alternate Methods to Compute C

In this method, the use of $S_{zz}$ is avoided for computing the matrix C and subsequently other dependent matrices of GDFE Precoder.

The expression (12) is rewritten as:

$$C[HS_{xx}H^H + S_{zz}] = (HV\Sigma^{1/2})^H \quad (18)$$

Next, the expression $H^H[HS_{xx}H^H + S_{zz}]^{-1}H = \lambda I$ given in reference [7] is alternatively expressed as:

$$[HS_{xx}H^H + S_{zz}] = \lambda^{-1}HH^H \quad (19)$$

where $\lambda$ is computed using (11).

Next, the expression in (19) is substituted in (18) to obtain the following equality $$CHH^H = \lambda(V\Sigma^{1/2})^H H^H \quad (20)$$

Now, for a channel matrix H whose rank is greater than or equal to its number of rows, the matrix C can be uniquely determined as:

$$C = \lambda(V\Sigma^{1/2})^H H^\dagger \quad (21)$$

(step 404 in FIG. 4) where the superscript † denotes the Moore-Penrose Generalized Inverse. Furthermore, omitting the scalar operation $\lambda$ in above expression does not alter the performance of GDFE Precoder. Therefore, following expression can also be used for channels whenever the rank of H is greater than or equal to the number of rows in H (step 410 in FIG. 4):

$$C = (V\Sigma^{1/2})^H H^\dagger \quad (22)$$

For the channel matrix H whose rank is less than its number of rows, the matrix C can be determined by solving the following limit:

$$C = \lambda(V\Sigma^{1/2})^\dagger \lim_{X \to 0} S_{xx}[HX]^\dagger \quad (23)$$

where X is an arbitrary matrix with same number of rows as H. The number of columns in X is chosen so that the rank of the resulting matrix [H X] is greater than or equal to the number of rows in H. Here, the matrix $S_{xx}$ denotes the input covariance matrix for the effective downlink channel matrix [H X].

The expression in (23) can be simplified using (10) along with some matrix manipulations as $$C = (HV\Sigma^{1/2})^\dagger [I - (HH^H D + I)^{-1}] \quad (24)$$

This expression can be further simplified using matrix inversion identities as $$C = \sqrt{\Sigma^\dagger}(HV)^\dagger HV[I - \lambda\Sigma]V^H H^H D \quad (25)$$

Here the matrix product $(HV)^\dagger HV$ in (25) is equal to a diagonal matrix with leading diagonal entries being 1 and the rest of trailing entries being 0. The number of diagonal entries equal to 1 is same as the rank of H. Observing that the rank of the matrix product HV is always greater than or equal to that of Sigma, it can be ensured that the number of trailing zeros in the matrix product $(HV)^\dagger HV$ are always less than or equal to those in $\Sigma$.

Hence the above expression in (25) can be further simplified as $$C = [\sqrt{\Sigma^\dagger} - \lambda\sqrt{\Sigma}]V^H H^H D \quad (26)$$

(step 405 in FIG. 4). Here it should be noted that expressions (24), (25) and (26) can be used for any arbitrary channel matrix H. However when the rank of channel matrix is greater than or equal to its number of rows, expression in (21) or (22) may be used because of possible computational efficiency.

B.2 NUMERICAL EXAMPLES

Example-1

Using Eq. (12) to Compute C

The following numerical example illustrates the computation of various matrices involved in the design of GDFE Precoder for the case when $S_{zz}$ is known beforehand, i.e. C is computed using equation (12).

Consider a BS with 4 antennas and 2 users with 2 antennas each, so that channel matrices associated with both the users are of dimension 2×4. Let the overall channel matrix be the following:

$$H = \begin{bmatrix} H_1 \\ H_2 \end{bmatrix} = \begin{bmatrix} 0.8156 & 1.1908 & -1.6041 & -0.8051 \\ 0.7119 & -1.2025 & 0.2573 & 0.5287 \\ 1.2902 & -0.0198 & -1.0565 & 0.2193 \\ 0.6686 & -0.1567 & 1.4151 & -0.9219 \end{bmatrix} \quad (27)$$

For fixed transmit power of 20, the optimal input covariance matrix $S_{xx}$ for the downlink channel can be computed by first computing the optimal input covariance matrix D for the equivalent Uplink/MAC channel as described in [6] and then using the equation (10):

$$S_{xx} = \begin{bmatrix} 6.0504 & -0.8646 & -0.5495 & -0.9077 \\ -0.8646 & 4.0316 & -1.5417 & -2.4559 \\ -0.5495 & -1.5417 & 5.7918 & -1.3812 \\ -0.9077 & -2.4559 & -1.3812 & 4.1262 \end{bmatrix} \quad (28)$$

The Eigen Value Decomposition (EVD) of $S_{xx}$ can be computed as:

$$V = \begin{bmatrix} -0.1548 & 0.2203 & 0.9335 & 0.2367 \\ -0.5546 & 0.3955 & -0.3485 & 0.6438 \\ 0.8032 & 0.4608 & -0.0697 & 0.3711 \\ 0.1528 & -0.7634 & 0.0468 & 0.6259 \end{bmatrix} \quad (29)$$

and $$\Sigma = \begin{bmatrix} 6.6995 & 0 & 0 & 0 \\ 0 & 6.4942 & 0 & 0 \\ 0 & 0 & 6.3688 & 0 \\ 0 & 0 & 0 & 0.4375 \end{bmatrix} \quad (30)$$

Also, the "Least Favorable Noise" covariance matrix $S_{zz}$ may be computed using the technique described in reference [4] as $$S_{zz} = \begin{bmatrix} 1.0000 & 0 & 0.4726 & 0.0573 \\ 0 & 1.0000 & 0.5846 & 0.0867 \\ 0.4726 & 0.5846 & 1.0000 & 0 \\ 0.0573 & 0.0867 & 0 & 1.0000 \end{bmatrix} \quad (31)$$

Following the details outlined in Method-I, the following QR Decomposition is first computed $$C = (HV\Sigma^{1/2})^H [HS_{xx}H^H + S_{zz}]^{-1} \quad (32)$$

$$= \underbrace{\begin{bmatrix} -0.3746 & 0.6016 & 0.4650 & -0.5306 \\ 0.3008 & -0.5290 & 0.0216 & -0.7932 \\ -0.0990 & 0.3554 & -0.8802 & -0.2985 \\ -0.8715 & -0.4815 & -0.0924 & -0.0118 \end{bmatrix}}_{M}$$

$$\underbrace{\begin{bmatrix} 0.2669 & 0.2024 & -0.2817 & -0.0087 \\ 0 & 0.2413 & -0.0786 & -0.0562 \\ 0 & 0 & -0.2281 & -0.0542 \\ 0 & 0 & 0 & -0.2050 \end{bmatrix}}_{R}$$

Next, the method computes the transmit filter matrix B as $$B = V\Sigma^{1/2}M = \begin{bmatrix} -0.0508 & 0.2239 & -2.2623 & -0.9378 \\ 0.5568 & -1.9145 & 0.0891 & 0.2198 \\ -0.6220 & 0.4488 & 1.1241 & -1.9849 \\ -1.1057 & 1.1097 & -0.0002 & 1.2931 \end{bmatrix} \quad (33)$$

The effective feedforward filter can be computed as:

$$F = \begin{bmatrix} F_1 & 0 \\ 0 & F_2 \end{bmatrix} = \quad (34)$$

$$BlockDiag(R) = \begin{bmatrix} 0.2669 & 0.2024 & 0 & 0 \\ 0 & 0.2413 & 0 & 0 \\ 0 & 0 & -0.2281 & -0.0542 \\ 0 & 0 & 0 & -0.2050 \end{bmatrix}$$

Therefore, the two users employ the following feedforward filters for baseband signal processing as shown in Eq. (7).

$$F_1 = \begin{bmatrix} 0.2669 & 0.2024 \\ 0 & 0.2413 \end{bmatrix}, F_2 = \begin{bmatrix} -0.2281 & -0.0542 \\ 0 & -0.2050 \end{bmatrix} \quad (35)$$

Also, the interference pre-cancellation matrix G can be computed as:

$$G = FR^{-1} = \begin{bmatrix} 1 & 0 & -1.2347 & 0.2841 \\ 0 & 1 & -0.3447 & -0.1831 \\ 0 & 0 & 1 & 0 \\ 0 & 0 & 0 & 1 \end{bmatrix} \quad (36)$$

Example-2

Using Eq. (22) to Compute C

The following numerical example illustrates the computation of various matrices involved in the design of GDFE Precoder when $S_{zz}$ is unknown. The same system as in Example-1 with transmit power fixed to 20 is assumed so that matrices H, $S_{xx}$, V, and $\Sigma$ are given by Equations (27)-(30) respectively.

Following the details outlined in B.1, compute the matrix C and its QR Decomposition:

$$C = (V\Sigma^{1/2})^H H^{-1} \quad (37)$$

$$= \underbrace{\begin{bmatrix} -0.3746 & 0.6016 & 0.4650 & 0.5306 \\ 0.3008 & -0.5290 & 0.0216 & 0.7932 \\ -0.0990 & 0.3554 & -0.8802 & 0.2985 \\ -0.8715 & -0.4815 & -0.0924 & 0.0118 \end{bmatrix}}_{M}$$

$$\underbrace{\begin{bmatrix} 1.8267 & 1.3854 & -1.9276 & -0.0599 \\ 0 & 1.6511 & -0.5381 & -0.3848 \\ 0 & 0 & -1.5611 & -0.3712 \\ 0 & 0 & 0 & 1.4027 \end{bmatrix}}_{R}$$

Next, the method computes the transmit filter matrix B as $$B = V\Sigma^{1/2}M = \begin{bmatrix} -0.0508 & 0.2239 & -2.2623 & 0.9378 \\ 0.5568 & -1.9145 & 0.0891 & -0.2198 \\ -0.6220 & 0.4488 & 1.1241 & 1.9849 \\ -1.1057 & 1.1097 & -0.0002 & -1.2931 \end{bmatrix} \quad (38)$$

Also, the effective feedforward filter is computed as:

$$F = \begin{bmatrix} F_1 & 0 \\ 0 & F_2 \end{bmatrix} = \quad (39)$$

$$BlockDiag(R) = \begin{bmatrix} 1.8267 & 1.3854 & 0 & 0 \\ 0 & 1.6511 & 0 & 0 \\ 0 & 0 & -1.5611 & -0.3712 \\ 0 & 0 & 0 & 1.4027 \end{bmatrix}$$

Therefore, the two users employ the following feedforward filters for baseband signal processing as shown in Eq. (7).

$$F_1 = \begin{bmatrix} 1.8267 & 1.3854 \\ 0 & 1.6511 \end{bmatrix}, F_2 = \begin{bmatrix} -1.5611 & -0.3712 \\ 0 & 1.4027 \end{bmatrix} \quad (40)$$

Also, the interference pre-cancellation matrix G is computed as:

$$G = FR^{-1} = \begin{bmatrix} 1 & 0 & -1.2347 & -0.2841 \\ 0 & 1 & -0.3447 & 0.1831 \\ 0 & 0 & 1 & 0 \\ 0 & 0 & 0 & 1 \end{bmatrix} \quad (41)$$

Example-3

Using Eq. (22) to Compute C

Consider the same system as in previous example but fix the transmit power to 10 instead of 20 as in pervious two examples. In this case, the matrices associated with the GDFE Precoder can be shown to be:

$$B = \begin{bmatrix} -0.1416 & 0 & -1.6054 & -0.6715 \\ 1.3873 & 0 & 0.0617 & 0.1574 \\ -0.5284 & 0 & 0.8176 & -1.4211 \\ -1.0834 & 0 & -0.0106 & 0.9258 \end{bmatrix} \quad (42)$$

From Eq. (42), it is apparent that the $2^{nd}$ column of B is zero, implying that the second element in $x_1$ is assigned 0 transmit power. It is therefore suggested to transmit only 1 symbol to UT-1 and 2 symbols to UT-2, that is set $u_1 = [u_{11}\ 0]^T$, $u_2 = [u_{21}\ u_{22}]^T$ so that $u = [u_1^T\ u_2^T]^T$. The rest of matrices associated with the GDFE precoder can be shown to be:

$$F_1 = \begin{bmatrix} 0.6711 & -0.5106 \\ 0 & 0 \end{bmatrix}, F_2 = \begin{bmatrix} -1.1131 & -0.2532 \\ 0 & -1.0043 \end{bmatrix} \quad (43)$$

and $$G = \begin{bmatrix} 1 & 0 & -0.3246 & 0.2913 \\ 0 & 1 & 0 & 0 \\ 0 & 0 & 1 & 0 \\ 0 & 0 & 0 & 1 \end{bmatrix} \quad (44)$$

Example-4

Using Eq. (26) to Compute C

The following numerical example illustrates the computation of various matrices involved in the design of a GDFE Precoder when channel matrix H is rectangular. Consider a BS with 4 antennas and 2 users with 3 antennas each, so that channel matrices associated with both the users are of dimension 3×4. The overall channel matrix is non-square, for example:

$$H = \begin{bmatrix} H_1 \\ H_2 \end{bmatrix} = \begin{bmatrix} 0.5869 & 2.3093 & 0.4855 & 0.1034 \\ -0.2512 & 0.5246 & -0.0050 & -0.8076 \\ 0.4801 & -0.0118 & -0.2762 & 0.6804 \\ 0.6682 & 0.9131 & 1.2765 & -2.3646 \\ -0.0783 & 0.0559 & 1.8634 & 0.9901 \\ 0.8892 & -1.1071 & -0.5226 & 0.2189 \end{bmatrix} \quad (45)$$

Now, for fixed transmit power of 20 the optimal input covariance matrix $S_{xx}$ for the downlink channel can be computed using the MAC/BC duality of reference [6] and is given by:

$$S_{xx} = \begin{bmatrix} 4.6266 & 0.1030 & -0.0070 & -0.1029 \\ 0.1030 & 5.1215 & 0.0841 & -0.0162 \\ -0.0070 & 0.0841 & 5.1006 & -0.0201 \\ -0.1029 & -0.0162 & -0.0201 & 5.1513 \end{bmatrix} \quad (46)$$

The Eigen Value Decomposition (EVD) of $S_{xx}$ can be computed as:

$$V = \begin{bmatrix} 0.1964 & 0.0910 & -0.1458 & -0.9653 \\ 0.6582 & -0.3961 & -0.6117 & 0.1890 \\ 0.5017 & -0.3846 & 0.7731 & -0.0510 \\ -0.5258 & -0.8288 & -0.0825 & -0.1727 \end{bmatrix} \quad (47)$$

and $$\Sigma = \begin{bmatrix} 5.2293 & 0 & 0 & 0 \\ 0 & 5.1456 & 0 & 0 \\ 0 & 0 & 5.0375 & 0 \\ 0 & 0 & 0 & 4.5876 \end{bmatrix} \quad (48)$$

The optimal input covariance matrix D for the equivalent Uplink/MAC channel can be computed using the methods described in reference [6] as, $$D = \begin{bmatrix} 4.6635 & -0.1505 & 1.3687 & 0 & 0 & 0 \\ -0.1505 & 0.0049 & -0.0442 & 0 & 0 & 0 \\ 1.3687 & -0.0442 & 0.4017 & 0 & 0 & 0 \\ 0 & 0 & 0 & 5.1852 & -0.0224 & -0.0781 \\ 0 & 0 & 0 & -0.0224 & 5.0780 & -0.0875 \\ 0 & 0 & 0 & -0.0781 & -0.0875 & 4.6667 \end{bmatrix} \quad (49)$$

Now, matrix C can be computed using Eq. (26) as, $$C = [\sqrt{\Sigma^\dagger} - \lambda\sqrt{\Sigma}]V^H H^H D \quad (50)$$

$$= \underbrace{\begin{bmatrix} -0.3034 & -0.9436 & 0.0578 & 0.1189 \\ 0.4305 & -0.0129 & 0.2946 & 0.8531 \\ 0.6702 & -0.2708 & -0.6827 & -0.1066 \\ 0.5229 & -0.1899 & 0.6662 & -0.4968 \end{bmatrix}}_{M}$$

$$\underbrace{\begin{bmatrix} -0.2051 & 0.0066 & -0.0602 & 0.0298 & 0.0248 & -0.1351 \\ 0 & 0 & 0 & -0.1137 & -0.0494 & 0.0926 \\ 0 & 0 & 0 & -0.0365 & -0.1809 & -0.2138 \\ 0 & 0 & 0 & 0.1017 & -0.0913 & 0.1882 \end{bmatrix}}_{R}$$

Next, the method computes the transmit filter matrix B as $$B = V\Sigma^{1/2}M = \begin{bmatrix} -1.3479 & 0.0548 & -1.0671 & 1.2915 \\ -1.5520 & -1.1138 & 1.0294 & -0.6423 \\ 0.3822 & -1.5205 & -1.4481 & -0.7386 \\ -0.7619 & 1.2794 & -0.7433 & -1.5432 \end{bmatrix} \quad (51)$$

The effective feedforward filter can be computed as:

$$F = \begin{bmatrix} F_1 & 0 \\ 0 & F_2 \end{bmatrix} = BlockDiag(R) = \begin{bmatrix} -0.2051 & 0.0066 & -0.0602 & 0 & 0 & 0 \\ 0 & 0 & 0 & -0.1137 & -0.0494 & 0.0926 \\ 0 & 0 & 0 & -0.0365 & -0.1809 & -0.2138 \\ 0 & 0 & 0 & 0.1017 & -0.0913 & 0.1882 \end{bmatrix} \quad (52)$$

Therefore, the two users employ the following feedforward filters for baseband signal processing as shown in Eq. (7).

$$F_1 = \begin{bmatrix} -0.2051 & 0.0066 & -0.0602 \end{bmatrix}, \quad (53)$$

$$F_2 = \begin{bmatrix} -0.1137 & -0.0494 & 0.0926 \\ -0.0365 & -0.1809 & -0.2138 \\ 0.1017 & -0.0913 & 0.1882 \end{bmatrix}$$

It is apparent from Equations 52 and 53, that the first user is assigned only one symbol whereas the second user is assigned 3 symbols. That is, $u_1 = [u_{11}]$, $u_2 = [u_{21}\ u_{22}\ u_{23}]^T$ so that $u = [u_1^T u_2^T]^T$. The interference pre-cancellation matrix G can therefore be computed as:

$$G = FR^{-1} = \begin{bmatrix} 1 & 0.5545 & -0.1518 & 0.2721 \\ 0 & 1 & 0 & 0 \\ 0 & 0 & 1 & 0 \\ 0 & 0 & 0 & 1 \end{bmatrix} \quad (54)$$

The foregoing methods provide a way to improve the spectral efficiency of MU-MIMO systems at computational costs within reasonable bounds. The performance improvements are essentially the same as those provided by more computationally complex GDFE Precoders. Thus, the methods are well-suited to high speed digital cellular telephony, including developing standards such as IMT-Advanced, and other forms of high speed digital communication, including wired communications.

The foregoing methods may be embodied in various forms and implemented as methods, processes, systems, and components such as integrated circuits. In one typical implementation, the methods are carried out in software executed by a digital signal processor.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope all such changes and modifications as are within the true spirit and scope of this invention.

What is claimed is:

1. A base station of a multi-user multiple-input multiple-output (MU-MIMO) wireless system having k user terminals (UTs) with $L_k$ antennas each, each user terminal (UT) having associated therewith a feedforward filter represented by $F_1$, $F_2 \ldots, F_k$, the base station including a generalized decision feedback equalizer (GDFE) based precoder comprising:
    a feedforward path;
    a feedback path; and
    an interference pre-cancellation block denoted by I–G disposed in the feedback path, I being an identity matrix, G being an interference pre-cancellation matrix;
    wherein the interference pre-cancellation matrix G in the interference pre-cancellation block is determined by
    computing a filter matrix C using one of an expression which requires computation of $S_{xx}$ as an input covariance matrix for the downlink channel or an expression which does not require computation of $S_{xx}$, wherein a feedforward filter matrix F is represented by $F = GM^H C$, where M is a unitary matrix;
    computing the matrix M using QR decomposition (QRD) of C as $C = MR$;

computing the feedforward filter matrix F as $F = BlockDiagonal(R)$ where the BlockDiagonal(.) function extracts submatrices $F_1$, $F_2 \ldots, F_k$ of size $\{a_k \times L_k\}$ from block diagonals of the matrix R, and $a_k$ is a number of symbols allotted to the $k^{th}$ user terminal (UT) and equals the rank of $F_k$; and
    computing the interference pre-cancellation matrix G as $G = FR^\dagger$ where superscript $\dagger$ denotes a Moore-Penrose Generalized Inverse.

2. The base station of claim 1, wherein if the filter matrix C is computed using an expression which requires computation of $S_{xx}$, $S_{xx}$ is computed as $$S_{xx} = \frac{I - [H^H DH + I]^{-1}}{\lambda},$$

where I is an identity matrix, H is a channel matrix representing a channel through which communications occur in the wireless system, D is an input covariance matrix for an equivalent Uplink/medium access channel (MAC) in the wireless system which is chosen to be capacity optimal, and $\lambda$ is a scalar variable for a given total transmit power $P_t$, $\lambda = trace(I - [H^H DH + I]^{-1})/P_t$.

3. The base station of claim 1, wherein the GDFE based precoder further comprises:
    a modulo unit disposed in the feedforward path to produce a stream of filtered vector symbols X which are fed back through the interference pre-cancellation block disposed in the feedback path.

4. The base station of claim 3,
    wherein an output signal of the interference pre-cancellation block is subtracted from a stream of user symbols and applied to the modulo unit in the feedforward path.

5. The base station of claim 3, wherein the GDFE based precoder further comprises:
    a transmit filter represented by the transmit filter matrix B for filtering the stream of filtered vector symbols X produced by the modulo unit disposed in the feedforward path;
    wherein the transmit filter matrix B is $B = V\Sigma^{1/2} M$, where V is a unitary matrix, and $\Sigma$ is a diagonal matrix with non-negative entries.

6. A MU-MIMO wireless system comprising:
    the base station of claim 5;
    the plurality of k terminals; and a channel, represented by a channel matrix H through which communications occur in the wireless system with the user terminals, to receive an output of the transmit filter.

7. The MU-MIMO wireless system of claim 6,
wherein the wireless system includes N antennas and the $k^{th}$ user terminal (UT) has $L_k$ antennas,
wherein a sum of antennas at the UTs is denoted as $L = \sum_{k=1}^{K} L_k$,
wherein $H_k$ denotes a channel gain matrix of dimensions $\{L_k \times N\}$ between the base station and the $k^{th}$ UT,
wherein a combined channel gain matrix between the base station and the K UTs is of dimension $\{L \times N\}$ and is given by the channel matrix $H = [H_1^T H_2^T \ldots H_K^T]^T$, where the superscript $T$ denotes the matrix transpose.

8. A base station of a multi-user multiple-input multiple-output (MU-MIMO) wireless system having k user terminals (UTs) with $L_k$ antennas each, each user terminal (UT) having associated therewith a feedforward filter represented by $F_1, F_2 \ldots, F_k$, the base station including a generalized decision feedback equalizer (GDFE) based precoder comprising:
a feedforward path;
a feedback path; and
an interference pre-cancellation block denoted by I–G disposed in the feedback path, I being an identity matrix, G being an interference pre-cancellation matrix;
wherein the interference pre-cancellation matrix G in the interference pre-cancellation block is determined by computing a filter matrix C using the following expression $$C = \lambda (V \Sigma^{1/2})^H H^\dagger$$

for a channel matrix H whose rank is greater than or equal to its number of rows, the channel matrix H representing a channel through which communications occur in the wireless system, where superscript † denotes a Moore-Penrose Generalized Inverse, where V is a unitary matrix, where $\Sigma$ is a diagonal matrix with non-negative entries, where $\lambda$ is a scalar variable for a given total transmit power $P_t$, $$\lambda = \text{trace}(I - [H^H D H + I]^{-1})/P_t,$$

where I is an identity matrix, and D is an input covariance matrix for an equivalent Uplink/medium access channel (MAC) in the wireless system which is chosen to be capacity optimal, wherein a feedforward filter matrix F is represented by $F = G M^H C$, where M is a unitary matrix;
computing the matrix M using QR decomposition (QRD) of C as $$C = MR;$$

computing the feedforward filter matrix F as $$F = \text{BlockDiagonal}(R)$$

where the BlockDiagonal(.) function extracts submatrices $F_1, F_2 \ldots, F_k$ of size $\{a_k \times L_k\}$ from block diagonals of the matrix R, and $a_k$ is a number of symbols allotted to the $k^{th}$ user terminal (UT) and equals the rank of $F_k$; and
computing the interference pre-cancellation matrix G as $$G = FR^\dagger$$

where superscript † denotes a Moore-Penrose Generalized Inverse.

9. The base station of claim 8, wherein the GDFE based precoder further comprises:
a modulo unit disposed in the feedforward path to produce a stream of filtered vector symbols X which are fed back through the interference pre-cancellation block disposed in the feedback path.

10. The base station of claim 9,
wherein an output signal of the interference pre-cancellation block is subtracted from a stream of user symbols and applied to the modulo unit in the feedforward path.

11. The base station of claim 9, wherein the GDFE based precoder further comprises:
a transmit filter represented by the transmit filter matrix B for filtering the stream of filtered vector symbols X produced by the modulo unit disposed in the feedforward path;
wherein the transmit filter matrix B is $$B = V \rho^{1/2} M.$$

12. A MU-MIMO wireless system comprising:
the base station of claim 11;
the plurality of k terminals; and
a channel, represented by the channel matrix H through which communications occur in the wireless system with the user terminals, to receive an output of the transmit filter.

13. The MU-MIMO wireless system of claim 12,
wherein the wireless system includes N antennas and the $k^{th}$ user terminal (UT) has $L_k$ antennas,
wherein a sum of antennas at the UTs is denoted as $L = \sum_{k=1}^{K} L_k$,
wherein $H_k$ denotes a channel gain matrix of dimensions $\{L_k \times N\}$ between the base station and the $k^{th}$ UT,
wherein a combined channel gain matrix between the base station and the K UTs is of dimension $\{L \times N\}$ and is given by the channel matrix $H = [H_1^T H_2^T \ldots H_K^T]^T$, where the superscript $T$ denotes the matrix transpose.

14. A base station of a multi-user multiple-input multiple-output (MU-MIMO) wireless system having k user terminals (UTs) with $L_k$ antennas each, each user terminal (UT) having associated therewith a feedforward filter represented by $F_1, F_2 \ldots, F_k$, the base station including a generalized decision feedback equalizer (GDFE) based precoder comprising:
a feedforward path;
a feedback path; and
an interference pre-cancellation block denoted by I–G disposed in the feedback path, I being an identity matrix, G being an interference pre-cancellation matrix;
wherein the interference pre-cancellation matrix G in the interference pre-cancellation block is determined by computing a filter matrix C using the following expression $$C = (V \Sigma^{1/2})^H H^\dagger$$

for a channel matrix H whose rank is greater than or equal to its number of rows, the channel matrix H representing a channel through which communications occur in the wireless system, where superscript † denotes a Moore-Penrose Generalized Inverse, where V is a unitary matrix, and where $\Sigma$ is a diagonal matrix with non-negative entries, wherein a feedforward filter matrix F is represented by $F = G M^H C$, where M is a unitary matrix;
computing the matrix M using QR decomposition (QRD) of C as $$C = MR;$$

computing the feedforward filter matrix F as $$F = \text{BlockDiagonal}(R)$$

where the BlockDiagonal(.) function extracts submatrices $F_1, F_2 \ldots, F_k$ of size $\{a_k \times L_k\}$ from block diagonals of the matrix R, and $a_k$ is a number of symbols allotted to the $k^{th}$ user terminal (UT) and equals the rank of $F_k$; and computing the interference pre-cancellation matrix G as $$G=FR^\dagger$$

where superscript † denotes a Moore-Penrose Generalized Inverse.

15. The base station of claim 14, wherein the GDFE based precoder further comprises:
a modulo unit disposed in the feedforward path to produce a stream of filtered vector symbols X which are fed back through the interference pre-cancellation block disposed in the feedback path.

16. The base station of claim 15,
wherein an output signal of the interference pre-cancellation block is subtracted from a stream of user symbols and applied to the modulo unit in the feedforward path.

17. The base station of claim 15, wherein the GDFE based precoder further comprises:
a transmit filter represented by the transmit filter matrix B for filtering the stream of filtered vector symbols X produced by the modulo unit disposed in the feedforward path;
wherein the transmit filter matrix B is $$B=V\Sigma^{1/2}M.$$

18. A MU-MIMO wireless system comprising:
the base station of claim 17;
the plurality of k terminals; and
a channel, represented by the channel matrix H through which communications occur in the wireless system with the user terminals, to receive an output of the transmit filter.

19. The MU-MIMO wireless system of claim 18,
wherein the wireless system includes N antennas and the $k^{th}$ user terminal (UT) has $L_k$ antennas,
wherein a sum of antennas at the UTs is denoted as $L=\Sigma_{k=1}^{K}L_k$,
wherein $H_k$ denotes a channel gain matrix of dimensions $\{L_k \times N\}$ between the base station and the $k^{th}$ UT,
wherein a combined channel gain matrix between the base station and the K UTs is of dimension $\{L \times N\}$ and is given by the channel matrix $H=[H_1^T H_1^T \ldots H_K^T]^T$, where the superscript $^T$ denotes the matrix transpose.

* * * * *